United States Patent [19]

Hickox

[11] 4,208,908
[45] Jun. 24, 1980

[54] SPEED OF SOUND COMPENSATION FOR DOPPLER FLOWMETER

[75] Inventor: Richard M. Hickox, Naperville, Ill.

[73] Assignee: Leeds & Northrup Company, North Wales, Pa.

[21] Appl. No.: 953,813

[22] Filed: Oct. 23, 1978

[51] Int. Cl.² .............................................. G01F 1/66
[52] U.S. Cl. .................................................. 73/194 A
[58] Field of Search ............ 73/194 A, 644; 310/315, 310/346

[56] References Cited

U.S. PATENT DOCUMENTS

| | | | |
|---|---|---|---|
| 3,074,268 | 1/1963 | Rafferty et al. | 73/644 |
| 3,175,106 | 3/1965 | Sansom et al. | 73/644 X |
| 3,661,146 | 5/1972 | Peronneau et al. | 73/644 X |
| 3,731,532 | 5/1973 | Courty . | |
| 3,741,014 | 6/1973 | Tamura . | |
| 3,895,529 | 7/1975 | Moore . | |
| 3,913,386 | 10/1975 | Saglio | 73/644 |

Primary Examiner—Charles A. Ruehl
Attorney, Agent, or Firm—Raymond F. MacKay; William G. Miller, Jr.

[57] ABSTRACT

An ultrasonic Doppler flowmeter in which the transmitting and receiving transducers are located in a head that is secured to the outer surface of a pipe through which the fluid to be measured flows. The head includes a thermistor responding to the temperature of the head to temperature-compensate the flow indication of the flowmeter. The Doppler-shifted received frequency is added to the transmitted frequency and the envelope of the resulting signal detected and amplified. The Doppler signal is shaped and used to switch on a current source for a fixed time interval at a rate dependent upon the Doppler frequency. The thermistor located in the transducer head varies, in accordance with temperature, the magnitude of the switched current. The switched current is integrated and used to supply the signal to the output meter.

6 Claims, 3 Drawing Figures

SPEED OF SOUND COMPENSATION FOR DOPPLER FLOWMETER

BACKGROUND OF THE INVENTION

This invention relates to Doppler-type ultrasonic flowmeters and more particularly to the compensation of the flowmeter for variations in temperature.

In ultrasonic flowmeters of the Doppler type, a wave of ultrasonic energy is directed into the fluid whose flow is to be measured substantially along the axis of fluid flow. The flow is determined by the change in frequency of the ultrasonic energy as it is reflected from the flowing fluid. In order for there to be reflections from the fluid, it is necessary that the fluid contain reflectors which may be in the form of particles, sediment, bubbles or other masses within the fluid which provide different acoustic impedance from that of the fluid.

The relationship between the Doppler frequency and the velocity of the fluid is given by the following equation:

$$v = -f_D C_F / 2 f_S \sin \theta_F \quad (1)$$

where
$f_S$ is the frequency of the ultrasonic wave from the transmitter
$C_F$ is the speed of sound in the fluid
$f_D$ is the Doppler frequency, and
$\theta_F$ is the complement of the angle of attack (the angle between the direction of movement of the fluid and the ultrasonic beam path)

As it is well known that the speed of sound in a medium changes with the temperature of the medium, the relationship between the velocity of the fluid and the Doppler frequency as expressed in equation (1) will vary with the temperature of the fluid. Most of the prior art applications of Doppler ultrasonic flowmeters is in the measurement of blood flow and the problem of large temperature variations is not encountered. U.S. Pat. No. 3,741,014, directed to an ultrasonic flowmeter, identifies the problem of inaccuracy present in conventional ultrasonic Doppler flowmeters due to temperature changes of the medium. In order to overcome the problem, that patent proposes that there be inserted in front of the transmitter and the receiver a prism lens to automatically change the direction of the ultrasonic beam of the transmitter and receiver in response to temperature changes of the fluid.

SUMMARY OF THE INVENTION

It is an object of this invention to provide an ultrasonic Doppler flowmeter that is compensated for changes in the velocity of sound in the flowing fluid due to changes in temperature of the fluid. It is to be noted that equation (1) includes the term $C_F / \sin \theta_F$. If the fluid whose flow is to be measured is flowing in a conduit or pipe, it is possible to have the ultrasonic energy transmitted to the fluid through the wall of the pipe by locating the transmitting and receiving ultrasonic transducers outside of the pipe and ultrasonically coupled by an encapsulant to the outer surface of the pipe. In view of the difference in material of the flowing fluid and the wall material of the pipe, the ultrasonic energy passes through the wall of the pipe at a speed and angle that differs from the speed and angle in the flowing fluid. As the ultrasonic beam obeys Snell's Law of Refraction, the ratio of the speed of sound in the fluid to the sine of the angle of refraction into the fluid is equal to the ratio of the speed of sound in the pipe wall to the sine of the angle of incidence. Similarly, for the interface between the pipe wall and the encapsulant in which the transmitting and receiving transducers are imbedded, it follows that the ratio of the speed of sound in the flowing fluid to the sine of the angle of refraction in the flowing fluid is equal to the ratio of the speed of sound in the encapsulant to the sine of the angle of incidence to the interface between the encapsulant and the outer wall of the pipe. In order to achieve temperature compensation of the flowmeter, the temperature of the encapsulant is measured to provide a signal which varies in accordance with the temperature of the encapsulant and hence the speed of sound in the encapsulant and used to modify the indication of the flowmeter in accordance with that signal.

BRIEF DESCRIPTION OF THE DRAWINGS

Referring to FIG. 1, there is schematically illustrated a transducer head 10 of an ultrasonic Doppler flowmeter secured as by a suitable adhesive 13 such as an epoxy resin to the outer surface of the wall of a pipe 12 through which a fluid 14 flows. As shown, one wall of the transducer head 10 forms an acute angle with the outer wall of the pipe 12. To the inner surface of the sloping wall of the transducer head 10, there are secured by a suitable cement two thin layers 16 and 18 of sound-absorbing material such as, for example, wood. To the exposed faces of the thin layers 16 and 18 of wood, there are secured by a suitable cement ultrasonic transducers 20 and 22. The transducers 20 and 22 may be of any conventional type of ultrasonic transducer material such, for example, as lead zirconate titanate which when energized with an ac electrical signal generates ultrasonic waves or, conversely, when subjected to ultrasonic waves, produces alternating current outputs. Electrical leads to the transducers (not shown) enter the transducing head through a hole 23 in the end wall of the transducer head 10.

Referring to FIG. 2 and considering that the ultrasonic transducer 20 is energized by a high frequency ac signal to serve as an ultrasonic transmitter, a beam 26 of ultrasonic energy is emitted from the exposed surface of the transducer 20 substantially perpendicular to the outer surface of the transducer 20. In order to provide for efficient coupling of the ultrasonic energy from the transducer 20 to the outer surface of the pipe 12, the transducer head 10 is filled with an epoxy resin encapsulant 24. The beam 26 of ultrasonic energy is illustrated as a line extending through the encapsulant 24. The path of the ultrasonic beam of energy as it travels through the wall of the pipe 12 is indicated by beam 28. It will be noted that at the interface between the encapsulant 24 and the wall of the pipe 12, the angle of incidence of the beam 26 shown as $\theta_E$ differs from the angle of refraction of the beam 28 shown as $\theta_P$. As well known to those skilled in the art, the relationship between the angle of incidence and the angle of refraction is governed by Snell's Law and is dependent upon the relative magnitudes of the speed of sound in the two materials. Similarly, when the ultrasonic beam 28 reaches the interface between the wall of the pipe 12 and a fluid 14 within the pipe, there is another change in its direction as shown by the beam 30 having an angle of refraction identified as $\theta_F$. Again, the angles of incidence and refraction are dependent upon the relative magnitudes of the speed of sound in the wall of the pipe 12 and the fluid 14.

Ultrasonic Doppler flowmeters depend upon the reflection of ultrasonic energy from reflectors contained in the flowing fluid. In order for a Doppler ultrasonic flowmeter to function, the flowing fluid must include areas or masses in which the speed of sound transmission varies from the speed of sound transmission in the fluid to provide the required reflectors. In FIG. 2, a single reflector 32 is shown as being representative of a group of reflectors contained in the flowing fluid 14. When the ultrasonic energy impinges upon the reflector 32, a component of this energy is reflected along beam paths 30, 28 and 26 back to the transducer head 10.

Some of the ultrasonic energy reflected from the reflectors in the flowing fluid 14 impinges on the face of the transducer 22. The frequency of the reflected energy differs from the frequency of the transmitted ultrasonic energy due to the Doppler effect which difference in frequency is referred to as the Doppler frequency and is related to the speed of the reflector as set forth in Equation (1). It is to be understood that the reflectors contained in the fluid 14 generally travel through the pipe 12 at different flow rates governed in part, for example, by the drag influence of the inner surface of the wall of pipe 12 and also by any turbulence that may be present in the flowing fluid. There is thus produced a band of Doppler frequencies rather than a single discrete Doppler frequency. For purposes of consideration of this invention, however, it will be assumed that all of the reflectors in the fluid 14 are moving at the same velocity and therefore the reflected ultrasonic energy will have a single frequency.

Figure 2:
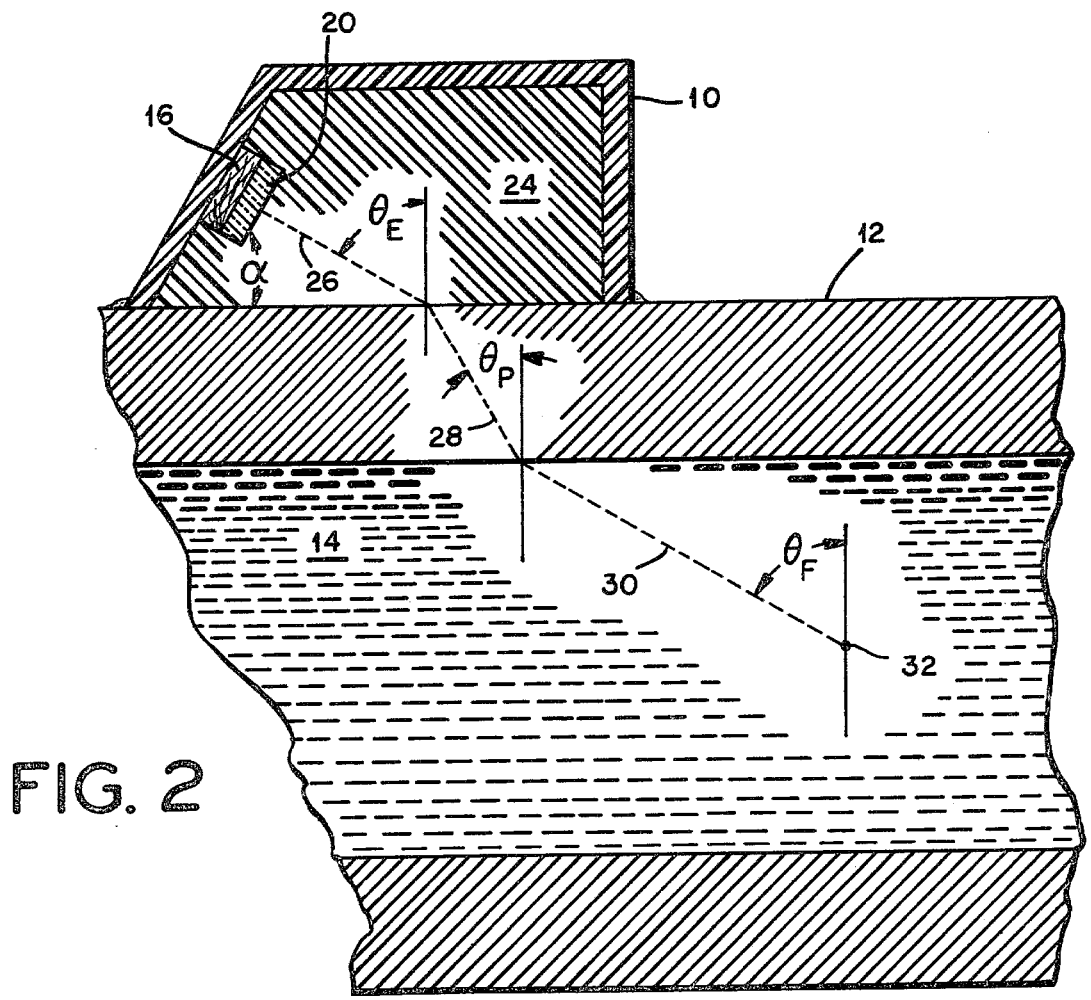
FIG. 2 illustrates a sectional view of the ultrasonic Doppler transducer head of FIG. 1 affixed to the outer surface of a pipe carrying a fluid, and showing the beam paths of ultrasonic energy.

The beam paths 26, 28, and 30, together with the angles $\theta_E$, $\theta_P$, and $\theta_F$ as shown in FIG. 2, are determined by the angle $\alpha$ between the face of the transducers and the wall of pipe 12 and the speed of sound in the encapsulant 24, the pipe 12 and the fluid 14. The angle $\alpha$ is determined by the sloping end wall of the transducer head 10 and is selected to provide satisfactory coupling of the ultrasonic energy between the transducer head and the pipe 12. It has been found that an angle in the order of 30° provides satisfactory operation.

Inasmuch as the angles $\theta_E$, $\theta_P$, and $\theta_F$ are interrelated by the relative speed of sound in the elements in the ultrasonic path identified as the encapsulant 24, the pipe wall 12, and the fluid 14, it will be appreciated that the angles as shown in FIG. 2 will only apply for a fixed temperature condition for each of the elements included in the ultrasonic path. Any change in temperature in any one of the elements will change the speed of sound in that element and thereby the angles of refraction to change the beam path pattern from that which is shown in FIG. 2. If the temperature of fluid 14, for example, should change to increase the speed of sound in the fluid 14, the angle $\theta_F$ would be increased by an amount determined by Snell's Law. Similarly, changes in the temperature of the pipe wall 12 could result in changes of angle $\theta_P$ as well as changes in the angle $\theta_F$. In view of this variation in the various angles at which the beam path travels through the components of the system, the only known angle for all temperature conditions is the angle at which beam path 26 emerges from the front face of transducer 20 which is determined by the fixed angle $\alpha$ at which the transducer 20 is mounted. Even though the beam path configuration undergoes significant change with changes of temperature of any of the elements in the ultrasonic path, it is nevertheless possible to compensate the ultrasonic Doppler flowmeter for changes in temperature of any of the elements in the ultrasonic path by measuring the temperature of the encapsulant 24 and utilizing this measurement to compensate the flowmeter indication for whatever changes in temperature may occur in any of the elements in the ultrasonic path.

Figure 1:
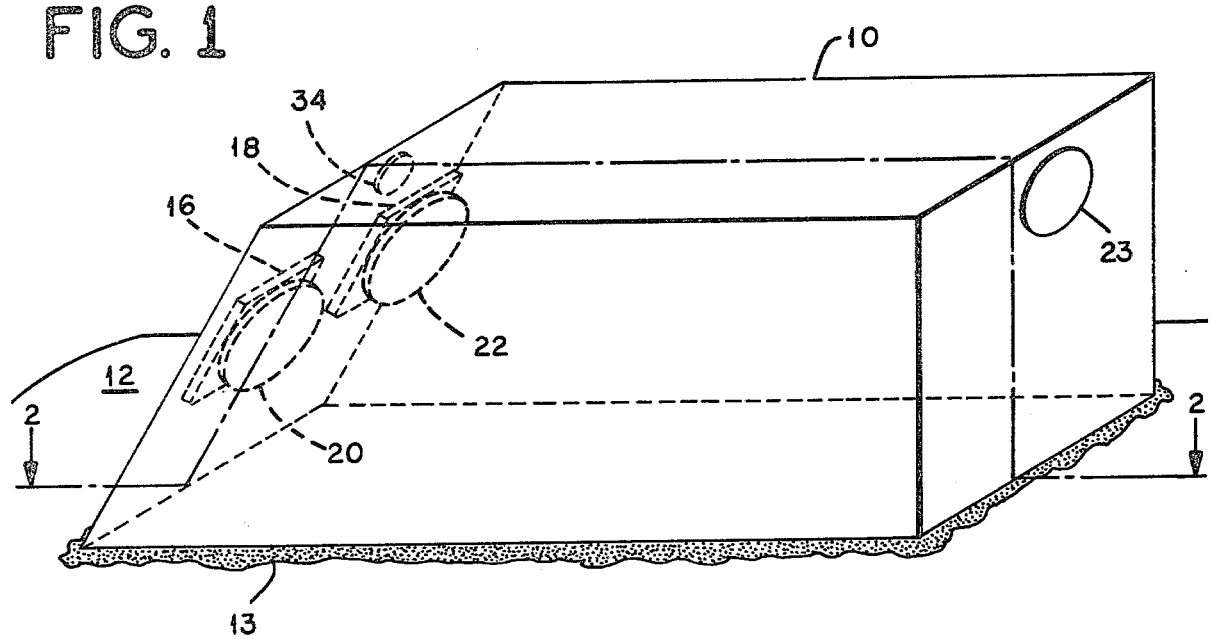
FIG. 1 is an isometric showing of a transducer head having a transmitting transducer, receiving transducer, and temperature compensating element.

As shown in FIG. 1, a thermistor 34 is located in close proximity to the transducers 20 and 22 within the encapsulant 24. It is desirable to mount the thermistor 34 close to the transducers 20 and 22 in order that the temperature of the encapsulant 24 at the transmitting and receiving faces of the transmitters 20 and 22 respectively be utilized for temperature compensation. It is quite possible in industrial environments that there may exist a temperature gradient through the encapsulant 24. If such a gradient should exist, then the beam path 26 rather than being straight, would have a curvilinear shape resulting from the differences in the speed of sound through the encapsulant produced by the differing temperatures. As the energy is emitted from the transducer 20 substantially perpendicular to the surface of the transducer 20, this angle is the only angle that is definitely known in the ultrasonic path. Therefore, the measurement of the temperature for temperature compensation purposes should theoretically be the temperature of the encapsulant 24 at the face of the transducers 20 and 22. However, for practical purposes other locations within the encapsulant 24 may be used.

Referring to Equation (1), it has been pointed out that the relationship between the velocity v and the Doppler frequency $f_D$ includes the term $C_F/\sin \theta_F$ and it is known that the speed of sound in the fluid 14 $C_F$ varies with temperature of the fluid 14. Referring to FIG. 2, and particularly the interface between the wall of the pipe 12 and the fluid 14 and applying Snell's Law of refraction, it is known that $$C_P/\sin \theta_P = C_F/\sin \theta_F \qquad (2)$$

In like manner, the relationships at the interface between the encapsulant 24 and the wall of the pipe 12 shows that $$C_E/\sin \theta_E = C_P/\sin \theta_P \qquad (3)$$

In view of the equalities expressed in Equations (2) and (3), Equation (1) may be rewritten as $$v = -f_D C_E/2f_S \sin \theta_E \qquad (4)$$

Inasmuch as angle $\theta_E$ is fixed by virtue of the fixed position of the transducer 20 in the transducer head 10, the only variable quantity in Equation (4), other than the Doppler frequency, is the speed of sound in the encapsulant 24. By measuring the temperature of the encapsulant 24, a compensation may be introduced into the flowmeter indication to compensate for changes in speed of sound in the encapsulant 24 due to changes in temperature of the encapsulant 24. It is thus possible to provide an ultrasonic Doppler flowmeter which is fully compensated for changes in temperature of the flowing fluid by attaching the transducer head 10 to the outside of the conduit or pipe in which the fluid flows and to measure the temperature within the transducer head 10.

Figure 3:
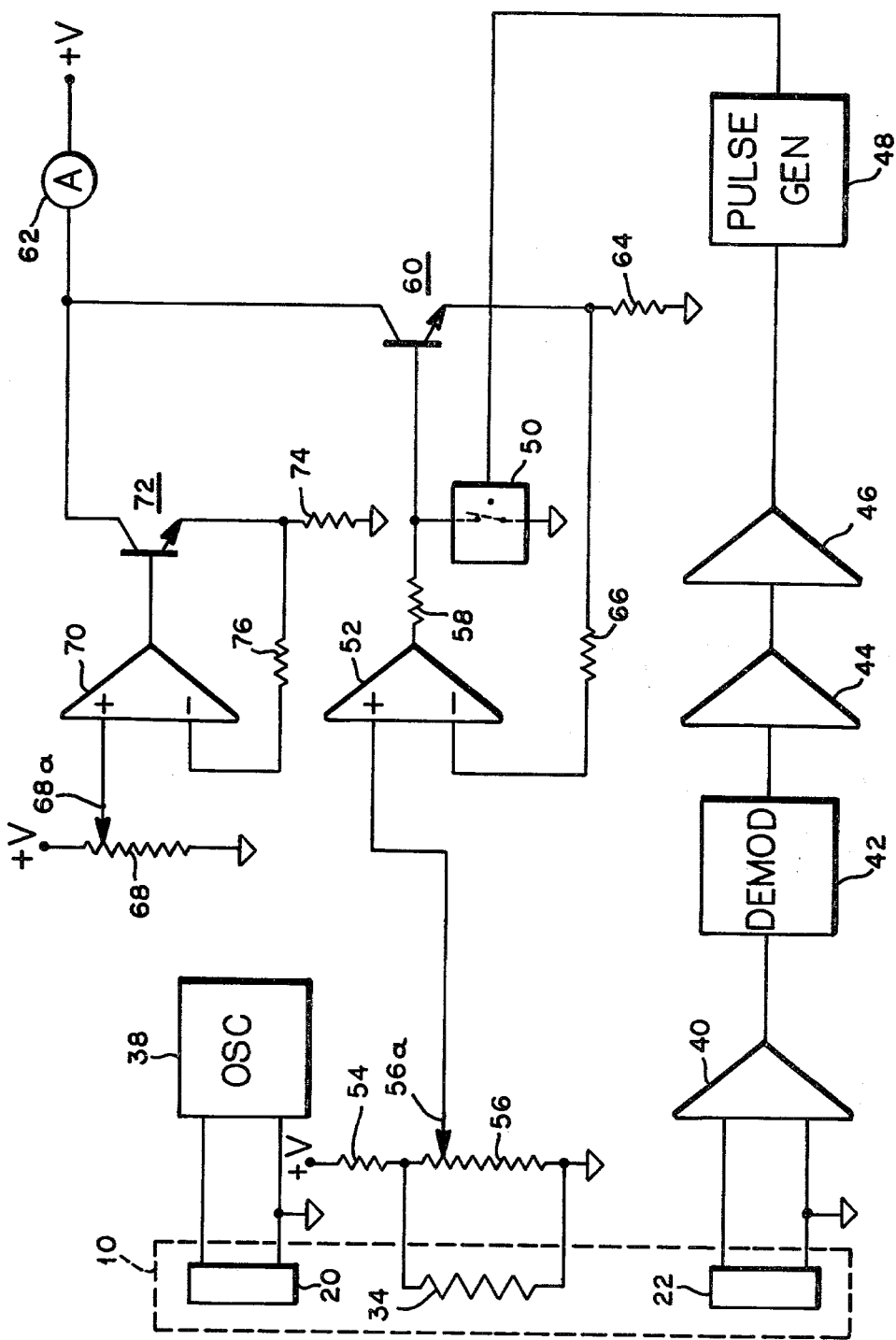
FIG. 3 is a circuit diagram showing the electronic circuitry for producing the temperature compensation of an ultrasonic Doppler flowmeter.

While FIG. 1 shows the physical arrangement of electrical elements within the transducer head 10, no attempt has been made to show the actual wiring to those elements. Referring to FIG. 3, the transducers 20 and 22 and thermistor 34 are shown electrically connected to a block diagram illustration of the electric circuit of the flowmeter. The transmitting transducer 20 is shown connected to an oscillator 38 which drives the transducer 20 at the frequency of the output from the oscillator, identified in Equation (1) as $f_S$ to produce an ultrasonic signal of that frequency. While the operation of the equipment is not limited to any particular frequency, it has been found that a frequency of 634 kHz has provided satisfactory operating characteristics. The receiving transducer 22 is shown electrically connected to the input of an RF amplifier 40.

The receiving transducer 22 basically receives two different ultrasonic signals. As mentioned previously, the ultrasonic receiving transducer 22 receives an ultrasonic signal having a received frequency that differs from the transmitted frequency by the Doppler frequency. This received signal from the reflectors in the flowing fluid 14 may be either greater than the transmitted frequency or it may be less than the transmitted frequency, depending upon whether the fluid 14 is flowing toward the ultrasonic transducers 20 and 22 or away from the ultrasonic transducers 20 and 22. The receiving transducer 22 not only receives the Doppler-shifted frequency, but also receives an ultrasonic signal directly from the transmitting transducer 20. The two signals impinging on the transducer 22 are added to provide a combined signal that may be considered as a carrier frequency at the transmitted signal with an envelope varying in magnitude at the Doppler frequency.

The carrier signal with the Doppler frequency envelope is amplified by the RF amplifier 40 and connected to a conventional demodulator circuit 42 including a low pass filter circuit to produce at the output of the demodulator circuit 42 an output audio frequency signal varying as the Doppler frequency. The output from the demodulator 42 is connected to an audio frequency amplifier 44 for amplification of the output signal from the demodulator 42. The amplified audio frequency signal from the audio frequency amplifier 44 is in turn connected to the input of a comparator amplifier 46. Comparator amplifier 46 is a high gain saturating amplifier to provide at its output a square wave signal having the same fundamental frequency as the audio signal applied to its input. Thus, the square wave signal output from the comparator amplifier 46 is a square wave having a fundamental frequency varying in accordance with the Doppler frequency. The output from the comparator amplifier 46 is applied to a pulse generator 48. The pulse generator 48 may be of conventional design and serves to produce a short pulse of fixed duration each time that the pulse generator 48 is triggered by a positive going leading edge of the square wave from comparator amplifier 46 applied to its input.

The precisely controlled pulses from the pulse generator 48 occur at a fundamental frequency representative of the Doppler shift in frequency produced by the movement of reflectors in the fluid 14. It is necessary then to use a pulse rate or frequency to current convertor to convert the pulses from the pulse generator 48 into a current proportional to the Doppler frequency. In order to convert the pulses from pulse generator 48 of frequency varying with the Doppler frequency into a current that is dependent upon the Doppler frequency, a switched current source is employed. As shown, a voltage from voltage source $+v$ is applied to resistor 54 to a potentiometer 56 having an adjustable contact 56a. The voltage appearing at the contact 56a is applied to the noninverting input of an amplifier 52. In response to the voltage applied to the input of amplifier 52, there is produced at its output a current flowing through a current limiting resistor 58 to the base of a transistor 60. The flow of current to the base of transistor 60 controls the current of transistor 60 that flows from the voltage source $+v$ through an ammeter 62 and a feedback resistor 64. The flow of current through the feedback resistor 64 produces a voltage which is applied by way of resistor 66 to the inverting input terminal of amplifier 52. There is thus produced a flow of current through the ammeter 62 by virtue of the feedback circuit through resistors 64 and 66 and the amplifier 52 a current that is of magnitude that is precisely related to the voltage applied to amplifier 52 from the adjustable contact 56a of the potentiometer 56. A switch 50 shown connected between the base of transistor 60 and chassis ground is connected to the output of pulse generator 48 to pulse the current flow through ammeter 62 and feedback resistor 64. The switch 50 may be of any conventional type such as, for example, an FET switch. Switch 50 is normally in its closed position which grounds the base of transistor 60 and results in "zero" current flow through the ammeter 62 and resistor 64. During the precisely regulated time interval that a pulse is produced by the pulse generator 48, the switch 50 is opened. There is during the period that the switch 50 is open a current pulse produced through the ammeter 62 which is accurately regulated not ony with respect to its time duration but also with respect to its magnitude. These precise pulses of current occuring at the Doppler frequency are integrated by the ammeter 62 to provide an indication that is an integrated or average value of current which is proportional to the Doppler frequency.

It will be noted that the potentiometer 56 determines the voltge applied to the input terminal of amplifier 52 and thus determines the magnitude of the current pulse to ammeter 62. Adjustment of the contact 56a relative to the potentiometer 56 changes the frequency to current conversion relation and thus serves as a span or gain adjustment for the Doppler flowmeter. It will be noted that the potentiometer 56 is shunted by the thermistor 34. As shown in FIG. 1, the thermistor 34 is imbedded in the encapsulant 24 to provide a resistance value that varies with the temperature of the encapsulant 24 and preferably with the encapsulant in the vicinity of the face of transducers 20 and 22. It will be readily appreciated that changes in the resistance of thermistor 34 due to changes in its temperature will vary the current flow through resistor 54 and thus change the voltage across the potentiometer 56 and thus the voltage appearing at the contact 56a. In turn this change of voltage applied to the input of the amplifier 52 will change the magnitude of the current pulse produced by the action of the switch 50. Variations in the magnitude of the resistance of thermistor 34 with temperature therefore varies the relationship between the indication of the meter 62 and the Doppler frequency at which switch 50 is switched to compensate for temperature changes in the speed of sound in the encapsulant 24 to provide an output indication on ammeter 62 that is not influenced by changes in temperature of the fluid, the pipe wall, or the encapsulant.

For industrial control purposes it is often desired to have a zero adjustment on the output from an indicator. In FIG. 3 there is shown a voltage to current converter circuit to apply to the ammeter 62 a current to permit the "zero flow" indication to be set at any point on the scale of ammeter 62. To accomplish this there is provided a potentiometer 68 having an adjustable contact 68a. The voltage at the adjustable contact 68a of potentiometer 68 is applied to the noninverting input of an amplifier 70 whose output is connected to the base of a transistor 72 to control the flow of current through the collector emitter junctions which are connected in series between the ammeter 62 and a current feedback resistor 74. The voltage developed across the feedback resistor 74 is applied by way of a resistor 76 to the inverting input terminal of amplifier 70. There is thus provided a current control circuit wherein the current flowing through ammeter 62 may be adjusted by means of adjustment of the contact 68a of potentionmeter 68.

There has been described one arrangement whereby an ultrasonic Doppler flowmeter may be compensated for temperature changes occuring in the flowing fluid by securing the ultrasonic transducers to the outer surface of the wall or conduit through which the fluid is flowing and varying the relationship between the Doppler frequency and the flowmeter indication in response to changes in temperature of the encapsulant in which the transducers are imbedded. The circuitry for accomplishing the compensation of the flowmeter indication is but one of many ways that may be used to produce the same result, i.e. to change the relationship between the Doppler frequency and the indication on the ammeter 62.

What is claimed is:

1. In a Doppler ultrasonic flowmeter having a transducer imbedded in an encapsulant the method of compensating for changes in flow indication of said flowmeter resulting from changes in temperature of the flowing fluid comprising the steps of:
   coupling said transducer to the outer surface of a conduit through which said fluid flows;
   producing a signal varying in accordance with the temperature of said encapsulant, and
   varying the indication of said flowmeter in accordance with the change in said signal.

2. In a clamp-on Doppler ultrasonic flowmeter having a relationship between the Doppler frequency and the flowmeter indication in which an ultrasonic transmitting transducer is embedded in an encapsulant within a transmitting head, and in which the ultrasonic energy is transmitted through a multielement path including at least said encapsulant within said transmitting head, the container for said flowing fluid and said fluid, the method of temperature compensating the flowmeter for changes in temperature of any of said path elements comprising the steps of:
   producing a signal varying in accordance with the temperature of the encapsulant, and
   varying said relationship between said Doppler frequency and said flowmeter indication in accordance with said signal.

3. An ultrasonic flowmeter for indicating the flow of fluid within a conduit by determining the Doppler frequency change due to said flow comprising:
   a transducer head secured to the outer surface of the wall of said conduit,
   transmitting means within said transducer head for transmitting an ultrasonic radiation beam into said conduit at a transmitted frequency,
   receiving means within said transducer head for receiving a reflected wave of ultrasonic radiation at a received frequency differing from said transmitted frequency by an amount determined by the flow of said fluid in said conduit.
   means connected to said receiving means for producing an output signal varying in accordance with the difference between said transmitted frequency and said received frequency, and
   temperature responsive means located within said transducer head and connected to said last named means to vary said output signal in accordance with the temperature in said transducer head whereby said output signal is compensated for changes in frequency difference due to temperature changes.

4. An ultrasonic clamp-on Doppler flowmeter for measuring the flow of fluid in a pipe comprising:
   a transducer head secured to the outer surface of said pipe and including an encapsulating material,
   oscillator means,
   a first transducer means encapsulated in said transducer head and connected to said oscillator means to transmit a wave of ultrasonic energy through said encapsulant and said pipe into said fluid,
   a second transducer means encapsulated in said transducer head responsive to reflected ultrasonic energy and to said transmitted ultrasonic energy for producing an electrical signal having an envelope frequency varying as the difference in frequency between said transmitted and said reflected ultrasonic energy.
   detector means connected to said second transducer means for producing an output signal having a magnitude varying in accordance with said envelope frequency of said electrical signal from said second transducer, and
   temperature responsive means encapsulated in said transducer head and connected to said detector means for varying the relation between said frequency component and said output signal from said detector means to compensate said output signal from said detector for changes due to changes in temperature of said encapsulant.

5. A flowmeter as claimed in claim 4 in which said detector means includes envelope detecting means producing an alternating signal having a frequency corresponding to said frequency component,
   signal shaping means connected to said envelope detecting means for producing pulses having a fundamental frequency corresponding to said frequency component, and
   a switched current source responsive to said pulses for producing an average output current varying in magnitude in accordance with said frequency component.

6. A flowmeter as claimed in claim 5 in which the magnitude of current from said switched current source is varied by said temperature responsive means.

* * * * *